United States Patent [19]
Kelly

[11] Patent Number: 5,943,167
[45] Date of Patent: Aug. 24, 1999

[54] HIGH EFFICIENCY RETROREFLECTING POLARIZER

[76] Inventor: Shawn L. Kelly, 8479 Pine Cove Dr., Commerce Township, Oakland County, Mich. 48382

[21] Appl. No.: 09/007,994

[22] Filed: Jan. 16, 1998

Related U.S. Application Data

[60] Provisional application No. 60/035,342, Jan. 16, 1997.

[51] Int. Cl.$^6$ .............................. G02B 5/30; G02B 5/124
[52] U.S. Cl. ......................... 359/487; 359/529; 359/900; 359/530
[58] Field of Search .................................. 359/487–490, 359/495–497, 529–530, 900

[56] References Cited

U.S. PATENT DOCUMENTS

| | | |
|---|---|---|
| 2,402,176 | 6/1946 | Marks . |
| 2,403,731 | 4/1946 | Nacneille . |
| 2,492,809 | 12/1949 | Marks . |
| 2,887,566 | 5/1959 | Marks . |
| 3,458,248 | 7/1969 | Eversole . |
| 4,553,822 | 11/1985 | Mahlein . |
| 4,556,292 | 12/1985 | Mathyssek et al. . |
| 5,157,526 | 10/1992 | Kondo et al. . |
| 5,394,253 | 2/1995 | Kelly . |
| 5,422,756 | 6/1995 | Weber . |
| 5,559,634 | 9/1996 | Weber . |
| 5,572,362 | 11/1996 | Shikama et al. ......................... 359/487 |

OTHER PUBLICATIONS

Polarization, Optics 2e, Klein Miles V. and Furtak, Thomas E., John Wiley & Sons, Inc., New York, 1986, pp. 596–598.
The Polarization of Light, Physical Optics 3e, Optical Society of America, Washington, D.C., 1988 (Original 1934), pp. 329–335.

*Primary Examiner*—James Phan
*Attorney, Agent, or Firm*—Lyon, P.C.

[57] ABSTRACT

A retroreflecting polarizer comprises a pair of first and second substrates, each essentially like the other, each having a planar first surface and a structured second surface, whereby the structured second surface comprises a linear array of isosceles prisms with faces formed at an angle of approximately $\tan^{-1}(1/n)$ with respect to the planar first surface. The respective structured second surfaces of the first and second substrates are mated with one another through one or more of substantially uniformly thick layers, all of the same optical material, that are parallel to the structured surfaces. The structured surfaces and layers are separated from one another by associated air gaps. The interfaces formed within the retroreflecting polarizer satisfy Brewster's condition for a light beam normally incident upon the retroreflecting polarizer which is split into a σ-polarized retroreflected light beam and a substantially π-polarized transmitted light beam.

9 Claims, 2 Drawing Sheets

HIGH EFFICIENCY RETROREFLECTING POLARIZER

CROSS-REFERENCE TO RELATED APPLICATIONS

The instant application claims the benefit of prior U.S. Provisional application Ser. No. 60/035,342 filed Jan. 16, 1997.

TECHNICAL ART

The instant invention generally relates to retroreflecting polarizers.

BACKGROUND OF THE INVENTION

Polarized light is created from most lamp assemblies using a flat window which absorbs one linear polarization state while passing the other. As an alternative, many device concepts are known within the art which do not absorb but actually reflect the unwanted polarization state using repeating prism structures. This reflected light can then be rotated or otherwise converted within the lamp assembly so that it passes through the prismatic device on future attempts, thereby delivering fully polarized light without the absorption losses of conventional polarizers.

However, such prismatic device concepts are difficult to manufacture because they require acute prism apex angles (90 degrees or less) and further require materials having a high index of refraction. Many such concepts further rely substantially on the conventional polarization properties of light incident at a 45 degree angle to a refractive boundary. These polarization properties are optimum at the Brewster angle which is dependent upon the indices of refraction of the adjoining media. For light passing from air into a material with an index of refraction of about 1.6, the associated Brewster angle is approximately 58 degrees, so that the above described prismatic device with a 45 degree angle to the refractive boundary would not achieve suitable efficiency unless expensive coatings are applied.

In accordance with Maxwell's Equations, at the Brewster angle, reflected light is polarized perpendicular to the plane of incidence, i.e. σ-polarization, and the transmitted/refracted light is mostly polarized parallel to the plane of incidence, i.e. π-polarization. The Brewster angle $\theta_B$ is given by $\theta_B = \tan^{-1}(n_T/n_I)$ where $n_T$ is the index of refraction of the medium of transmittance/refraction and $n_I$ is the index of refraction of the medium of incidence/reflection.

U.S. Pat. No. 5,559,634 to Weber discloses and claims a retroreflecting polarizer comprising a plurality of thin film stacks coated onto substrates having structured surfaces comprising a linear array of isosceles prisms having sides which make an angle in the range of 40–50 degrees, which is relatively expensive and difficult to produce because of the relatively large angle of the associated structured surface, and the need for a plurality of different coatings necessary to satisfy the MacNeille conditions whereby the reflection coefficient for π-polarization is essentially zero at each film interface.

SUMMARY OF THE INVENTION

The instant invention overcomes the above-noted problems by providing a retroreflecting polarizer comprising a pair of first and second substrates, each essentially like the other, each having a planar first surface and a structured second surface, whereby the structured second surface comprises a linear array of isosceles prisms with faces formed at an angle of approximately $\tan^{-1}(1/n)$ with respect to the planar first surface. The respective structured second surfaces of the first and second substrates are mated with one another through one or more of substantially uniformly thick layers that are parallel to the structured surfaces. The structured surfaces are separated from the proximally adjacent layers by associated air gaps, and the respective layers are also separated from one another by associated air gaps.

In operation, light normally directed upon the planar first surface of the first substrate is transmitted through the first substrate onto the structured second surface thereof. The angle of the structured surface satisfies the Brewster condition whereby upon reflection therefrom the reflected portion of the light beam is polarized normal to the plane of incidence. The remaining transmitted portion of the light beam refracts at the interface formed between the structured surface and the adjacent air gap so that the refracted light is polarized primarily within the plane of polarization. The instant invention is therefore adapted to polarized light in accordance with the Brewster condition whereby the polarization process occurs at an interface for which the light beam propagates from a high index of refraction to a low index of refraction, for which the associated structured surface can be constructed with relatively shallow angles and is therefore easier to manufacture.

After exiting the structured second surface of the first substrate, the light beam propagates through a plurality of layers, each essentially parallel to the structured second surface of the first substrate, and each constructed from the same optical material as the first substrate. The reflection and refraction processes at the interfaces created by each layer further separate the σ and π polarization components so as to improve the efficiency of the polarizer. The remaining π polarized light beam then exits the planar first surface of the second substrate in essentially the same direction as the incident beam.

In accordance with another aspect of the instant invention, a device is provided for transmitting one polarization state while reflecting an orthogonal state comprising an optical substrate of index of refraction n having a first planer surface, a second surface and a region between said surfaces comprising a plurality of air gaps, each layer alternating at an angle of plus and minus a slant angle from the first planer surface given by $\tan^{-1}(1/n)$.

In accordance with yet another aspect of the instant invention, a method for fabricating a polarizing device comprises the steps of positioning a top and bottom optical element each having an alternating prismatic structure so that the prismatic structures are facing each other, producing a plurality of uniformly thick windows, alternating in accordance with the above slant angle, and assembling them in a nested arrangement.

Accordingly, one object of the instant invention is to provide an apparatus for efficiently transmitting one polarization state while reflecting the orthogonal state.

A further object of the instant invention is to provide an apparatus for efficiently transmitting one polarization state while reflecting the orthogonal state that can be manufactured relatively easily.

A yet further object of the instant invention is to provide a method for efficiently transmitting one polarization state while reflecting the orthogonal state that can be accomplished with a single optical material.

In accordance with these objectives, one feature of the instant invention is a pair of substrates each constructed from a given optical material having a planar first surface and a structured second surface, whereby the structured second surface comprises a linear array of isosceles prisms with faces formed at an angle of approximately $\tan^{-1}(1/n)$ with respect to the planar first surface, whereby n is the index of refraction of the optical material.

Another feature of the instant invention are one or more layers interposed between the structured second surfaces of the first and second substrates, whereby each layer has an essentially uniform thickness and is essentially parallel to the structured second surfaces of the first and second substrates, and each layer is constructed from the same optical material as the first and second substrates.

Yet another feature of the instant invention are a plurality of associated air gaps adjacent each of the surfaces of each layer.

Yet another feature of the instant invention is a means of securing the substrates and layers to one another.

Yet another feature of the instant invention is a means of sealing the assembly of substrates and layers at the periphery thereof.

The specific features of the instant invention provide a number of associated advantages. One advantage of the instant invention with respect to the prior art is that by arranging the structured surfaces so as to satisfy the Brewster condition for light traveling from a high index of refraction media to a low index of refraction media, the structured surfaces can be constructed with shallower angles which provides for a more compact assembly, greater polarization efficiency, and reduced manufacturing costs.

Another advantage of the instant invention is that the instant invention can be constructed from elements which are each made from the same optical material.

Yet another advantage of the instant invention requires only two distinct parts.

The instant invention will be more fully understood after reading the following detailed description of the preferred embodiment with reference to the accompanying drawings. While this description will illustrate the application of the instant invention as a general retroreflective polarizer, it will be understood by one with ordinary skill in the art that the instant invention can be applied to lighting systems or to back lighting systems.

DETAILED DESCRIPTION OF THE PREFERRED EMBODIMENT(S)

Figure 1:
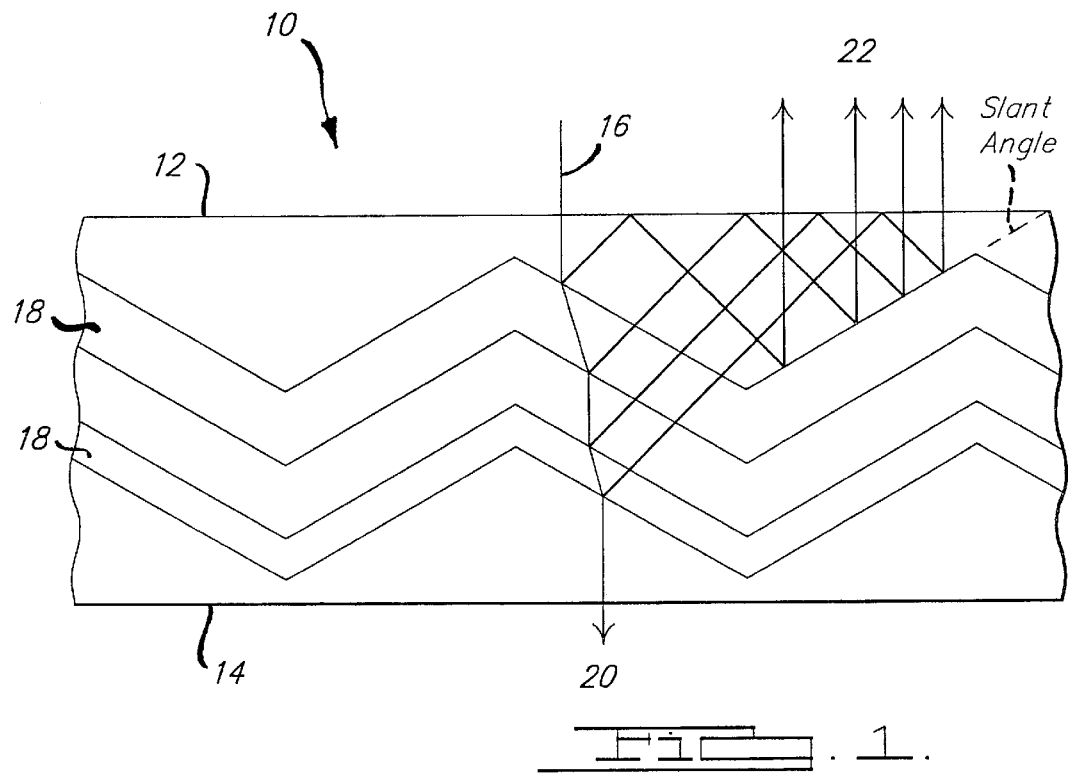
FIG. 1 is a cross section of the instant invention illustrating the retroreflection of polarized light

Referring to FIG. 1, a retroreflecting polarizer 10 has a planar first surface 12 and second surface 14 disposed orthogonal to an incident light beam 16. Within the retroreflecting polarizer 10 exists a plurality of air gaps 18 alternating at plus and minus the aforementioned slant angle with respect to the planar first surface 12. The incident light passing through the planar first surface 12 is therefore refracted at the interfaces of each air gap at an incidence angle equal to the Brewster polarization angle.

The incident light beam 16 passing through the plurality of air gaps 18 is therefore split in accordance with known principles into a reflected light beam 22 of one linear polarization state and a transmitted light beam 20 of primarily the orthogonal state. The reflected light beam 22, making an angle of incidence of twice the slant angle with the planar first surface 12, undergoes total internal reflection off planar first surface 12 to be directed back toward the air gaps 18 as is understood to one having ordinary skill in the art. Due to the alternating air gap angles, reflected light beam 22 is therefore either reflected off the faces of the multiple layers to pass orthogonally back through the planar first surface 12, or it passes between the air gaps, now acting as wave guides until the alternate angle of the air gaps is encountered, again reflecting back through planar first surface 12 in a substantially normal direction. The entirety of the reflected light beam 22 exiting the retroreflecting polarizer 10 is therefore polarized orthogonal to the transmitted light beam 20 transmitted through the retroreflecting polarizer 10.

Figures 2A, 2B:
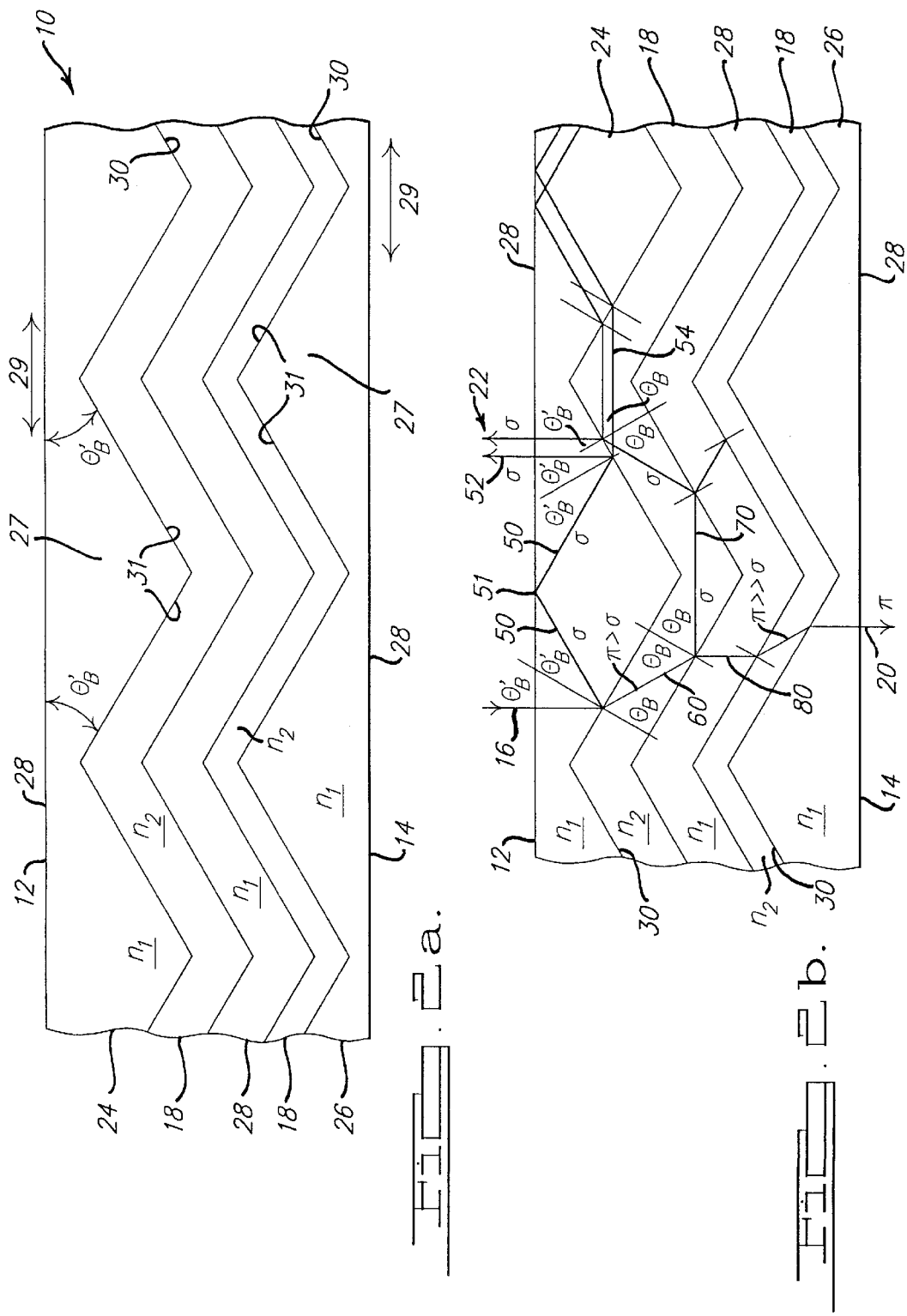
FIG. 2a is a cross section of the instant invention in accordance with FIG. 3b.
FIG. 2b illustrates the operation of the instant invention.

Alternately, referring to FIG. 2, retroreflecting polarizer 10 comprises first 26 and second 26 substrates of optical material and one or more layers 28 of the same optical material interposed therebetween. Each substrate further comprises a planar first surface 28; and a structured second surface 30 comprising of a linear array 29 of isosceles prisms 27 arranged side by side and having faces 31 formed at an angle of $\theta_B'$ with respect to said planar first surface, where $\theta_B$ is approximately $\tan^{-1}(1/n)$ with n being the index of refraction of said optical material The layers 28 are separated by air gaps 18.

In operation, an incident light beam 16 normal to the planar first surface 28 of the first substrate 28 is transmitted therethrough. The incident light beam 16 splits at the interface of the structured second surface 30 of the first substrate 24 into a first reflected light beam 50 and a first refracted light beam 60. Because the angle of incidence at the interface is $\theta_B'$ which satisfies the Brewster condition for light passing from a high index of refraction medium to a low index of refraction medium, the first reflected light beam 50 is σ-polarized and the first refracted light beam 60 is substantially π-polarized. If the index of refraction n of the optical material is greater than about 1.272 (i.e. greater than the value of n for which $\sin^2(\theta_B')=\cos(\theta_B')$), the first reflected light beam 50 will be totally internally reflected at the planar first surface 28. This first reflected light beam 50 is further split at the interface of the structured second surface 30 of the first substrate 24 into a second reflected light beam 52 and a second refracted light beam 54, whereby the reflected light beam 52 is returned by the retroreflecting polarizer 10 as the reflected light beam 22. The first refracted light beam 60 passes through a first air gap to the interface at the surface of the layer 28 of optical material and splits thereat into a third reflected light beam 70 and a third refracted light beam 80. Because the angle of incidence at the interface is $\theta_B=\tan^{-1}(n)$ which satisfies the Brewster condition for light passing from a low index of refraction medium to a high index of refraction medium, the third reflected light beam 70 is σ-polarized and the third refracted light beam 80 is substantially π-polarized. The processes of reflection and refraction under Brewster conditions continues within the retroreflecting polarizer 10, whereby the reflected light beam 22 retroreflected by the retroreflecting polarizer 10 comprises σ-polarized light and the transmitted light beam 20 transmitted through the retroreflecting polarizer 10 comprises substantially π-polarized light, whereby the percentage of π-polarized light therein increases with an increasing number of layers 28.

It is known within the art that multiple index interfaces employed at a Brewster angle of incidence will provide substantially complete polarization of the incident light. Deviations from the Brewster angle therefore require significantly greater layers to achieve the same result. Since the angles for any given light beams upon the operative polarizing surfaces of instant invention is closer to the Brewster angle than for prior art prismatic polarizers, the polarization efficiency of each layer is much greater, reducing the number of required layers. Further, for an optical material having an index of refraction of about 1.732 the instant invention employs prismatic structures having apex angles of approximately 120 degrees. For a given distance between adjacent elements of the structure, this results in over a 60% reduction in the material removal required to manufacture the structure compared to known devices, leading to greater control in the manufacturing process. Preferably, the depth of the prismatic elements comprising the structured surfaces should be relatively small so as to reduce the overall thickness of the retroreflecting polarizer. In one embodiment, the depth would be about 1 mm. Furthermore, the number of layers is preferably between 10 and 30, and the angles of the faces of the structured first and second surfaces are within plus or minus 5 degrees of the nominal $\tan^{-1}(1/n)$ value.

Figure 3:
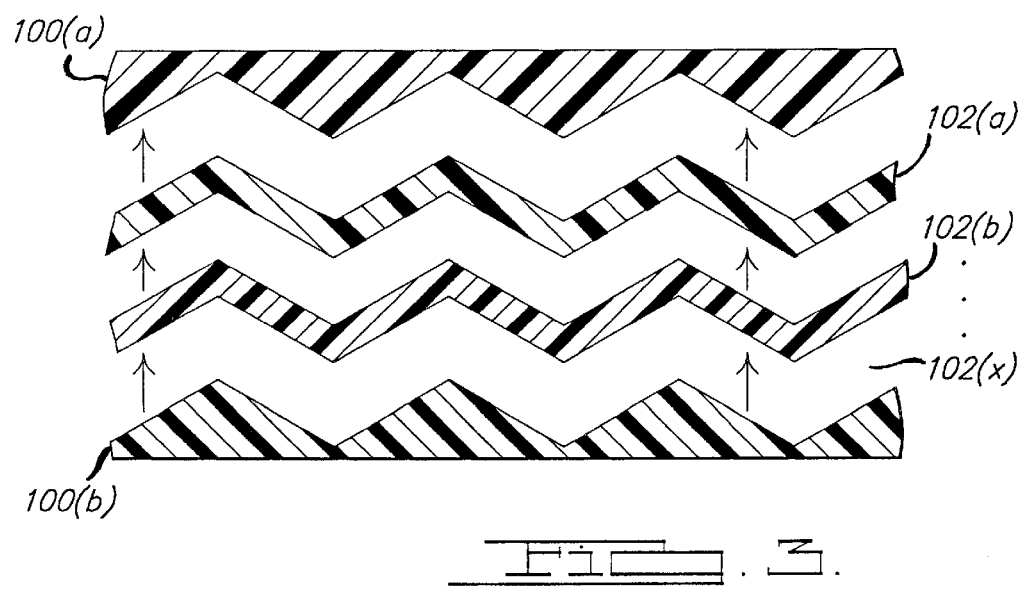
FIG. 3 is a cross section of the instant invention illustrating a method of assembly.

Referring FIG. 3, the instant invention is particularly attractive in that it may be readily manufactured using primarily only two distinct components 100 and 102. The top and bottom parts 100(*a*) and 100(*b*) are identical yet flipped, having a planar structure on one side an alternating surface on the other. Between these parts are placed ten to twenty units of a second part 102(*a*) to 102(*x*), each comprised of a single sheet of transparent material of uniform thickness, molded into an accordion shape with the alternating slanted structure. All parts will therefore easily mesh to form the retroreflecting polarizer 10 without special alignment arrangements, as indicated by the arrows shown in FIG. 3. Further, since a small air space is typical upon placing optical elements lightly together, no special arrangements are necessary to separate the parts. However, the periphery of the retroreflecting polarizer 10 should be sealed to prevent moisture from entering the air spaces and nullifying its function.

One of ordinary skill in the art will appreciate that while the instant invention is illustrated with air gaps between the layers of optical material, and between the first and second substrates and the layers of optical material proximate thereto, the air gaps could be replaced by a second optical material having an index of refraction lower than the index of refraction of the optical material from which the substrates and layers are constructed.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. A retroreflective polarizer, comprising:
    a. a first substrate of optical material having a planar first surface and a structured second surface, whereby said structured second surface comprises a linear array of isosceles prisms arranged side by side and having faces formed at an angle of approximately $\tan^{-1}(1/n)$ with respect to said planar first surface, where n is the index of refraction of said optical material;
    b. a second substrate essentially like said first substrate; and
    c. one or more layers of said optical material disposed between said structured second surfaces of said first and second substrates, wherein the surfaces of said layers are essentially parallel both to one another and to said structured second surfaces of said first and second substrates.

2. A retroreflective polarizer as recited in claim 1, wherein said layers are adjacent one another and said structured second surfaces of said first and second substrates are each adjacent one of said layers.

3. A retroreflective polarizer as recited in claim 1, further comprising associated air gap proximate to one or more of the surfaces of said layers.

4. A retroreflective polarizer as recited in claim 1, wherein the substrates are sealably connected to one another at the periphery of said substrates.

5. A retroreflective polarizer as recited in claim 1, wherein the said optical material is flexible.

6. A retroreflective polarizer as recited in claim 1, wherein said layers are secured to one another and to said first and second substrates with an optical adhesive at a plurality of locations.

7. A method of polarizing light, comprising
    a. directing a beam of light in a plane of incidence onto a planar first surface of a first substrate of optical material;
    b. transmitting said beam of light through said first substrate;
    c. reflecting a portion of said beam of light from a second surface of said first substrate such that the reflected beam is substantially polarized normal to said plane of incidence;
    d. refracting the substantially remaining portion of said beam of light by a medium having an index of refraction of essentially one;
    e. performing the following two operations one or more times;
    f. reflecting a portion of said substantially remaining portion of said beam of light from the first surface of a layer of said optical material such that the reflected beam is substantially polarized normal to said plane of incidence;
    g. refracting the substantially remaining portion of said beam of light by a medium having an index of refraction of essentially one;
    h. reflecting a portion of said substantially remaining portion of said beam of light from the second surface of a second substrate of said optical material such that the reflected beam is substantially polarized normal to said plane of incidence;
    i. refracting the substantially remaining portion of said beam of light through said second substrate.

8. A method of manufacturing a retroreflecting polarizer, comprising:
    a. constructing a first substrates from an optical material having a planar first surface and a structured second surface, wherein the structured second surface comprises a linear array of isosceles triangles arranged side by side and having faces formed at an angle of approximately $\tan^{-1}(1/n)$ with respect to said planar first surface, where n is the index of refraction of said optical material;
    b. constructing a second substrate essentially like said first substrate;
    c. constructing one or more layers from said optical material, each said layer having essentially uniform thickness and structured so as to mate between said structured second surfaces of said first and second substrates; and d. forming an assembly by assembling said one or more layers between said structured second surfaces of said first and second substrates.

9. A method of manufacturing a retroreflecting polarizer as recited in claim 8, further comprising the step of sealing the periphery of said assembly.

* * * * *